US008858082B2

(12) United States Patent
Hsu (10) Patent No.: US 8,858,082 B2
(45) Date of Patent: Oct. 14, 2014

(54) CIRCULATION MAINTAINING DEVICE FOR LINEAR SLIDE ASSEMBLY

(71) Applicant: Chieftek Precision Co., Ltd, Tainan (TW)

(72) Inventor: Ming-che Hsu, Tainan (TW)

(73) Assignee: Chieftek Precision Co., Ltd., Tainan (TW)

( * ) Notice: Subject to any disclaimer, the term of this patent is extended or adjusted under 35 U.S.C. 154(b) by 0 days.

(21) Appl. No.: 13/901,012

(22) Filed: May 23, 2013

(65) Prior Publication Data

US 2013/0315515 A1 Nov. 28, 2013

(30) Foreign Application Priority Data

May 23, 2012 (TW) ............................. 101118431 A (51) Int. Cl.
*F16C 29/06* (2006.01)
(52) U.S. Cl.
CPC ......... *F16C 29/0642* (2013.01); *F16C 29/0645* (2013.01); *F16C 29/0602* (2013.01)
USPC .............................................. 384/43; 384/45
(58) Field of Classification Search
CPC ... F16C 29/0642; F16C 29/0602; F16C 29/06
USPC ........................................ 384/13, 15, 43–45
See application file for complete search history.

(56) References Cited

U.S. PATENT DOCUMENTS

| | | | | |
|---|---|---|---|---|
| 4,743,124 A | * | 5/1988 | Blaurock | 384/45 |
| 5,800,064 A | * | 9/1998 | Ohya | 384/44 |
| 6,524,003 B2 | * | 2/2003 | Michioka et al. | 384/45 |
| 7,150,564 B2 | * | 12/2006 | Lee | 384/45 |
| 7,341,378 B2 | | 3/2008 | Kuwabara | |
| 7,354,198 B2 | * | 4/2008 | Nishihara | 384/13 |
| 7,553,084 B2 | * | 6/2009 | Chen | 384/45 |
| 7,862,236 B2 | * | 1/2011 | Chen | 384/45 |
| 2002/0114544 A1 | * | 8/2002 | Matsui et al. | 384/45 |
| 2003/0053724 A1 | * | 3/2003 | Matsui et al. | 384/45 |
| 2005/0018933 A1 | | 1/2005 | Ishihara | |
| 2006/0029307 A1 | * | 2/2006 | Fujimura et al. | 384/45 |
| 2011/0033141 A1 | * | 2/2011 | Chen et al. | 384/45 |

FOREIGN PATENT DOCUMENTS

| | | | | |
|---|---|---|---|---|
| DE | 202013104486 U1 | * | 12/2013 | F16C 29/06 |
| TW | M282068 | | 12/2005 | |
| TW | M310272 | | 4/2007 | |
| TW | M322487 | | 11/2007 | |

* cited by examiner

*Primary Examiner* — Marcus Charles
(74) *Attorney, Agent, or Firm* — Muncy, Geissler, Olds & Lowe, P.C.

(57) ABSTRACT

A circulation maintaining device for a linear slide assembly includes two top boards, four half mediate plates, two third half tubes, two bottom boards, and two end caps. Each of the above mentioned parts is manufactured integrally by way of injection molding and needs only one set of molds. These parts are connected to the slider symmetrically. Each of the half mediate tubes provides a second half tube and a half mediate plate. The second half tubes are inserted into the top holes and the bottom holes from two ends of the slider. The two half maintaining plates each have stops and recessed areas in longitudinal direction thereof so as to form restriction in transverse direction. The half maintaining plats each have ribs which are engaged with the grooves in the slider to provide positioning effect in a vertical direction.

19 Claims, 9 Drawing Sheets

CIRCULATION MAINTAINING DEVICE FOR LINEAR SLIDE ASSEMBLY

FIELD OF THE INVENTION

The present invention relates to a circulation maintaining device for a linear slide assembly, and more particularly, to a slider assembly on the slider for endless back-and-forth movement on rails.

BACKGROUND OF THE INVENTION

When the slider assembly is moving along the rails, the circulation maintaining device, the slider and the rails together form an enclosed circulation path which comprises a loaded path between the rails and the slider, two turning paths on two ends of the slider, and an unloaded path on the slider. Multiple rolling members are put in the circulation path so as to move endlessly along the enclosed circulation path such that the slider assembly can move smoothly on the rails.

The loaded path of the circulation path is composed of the roller maintaining plate, the first rails of the rail, the second rails for the slider. The roller maintaining plate and the slider are two elongate parts and have the same length. The roller maintaining plate usually has a top mainlining plate, a mediate maintaining plate and a bottom maintaining plate. In the conventional maintaining device, the connection portion is located at the two ends of the roller maintaining plate so as to be connected positioned by using pins, and this is disclosed in Taiwan Utility Model No. M322487, M310272 or M282068.

The shortcoming for the two above mentioned disclosures is that the area of the end face is too small so that the connection between the pins and the holes has a poor stiffness. The roller maintaining plate is easily deformed when the rolling members apply an outward force, so that the rolling members may not be easily kept in the circulation path. Besides, the connection position located at the ends of the roller maintaining plate may cause tolerance between the unloaded path and the returning path, interference is generated when the rolling members move between the returning path and the unloaded path.

In order to increase the stiffness of the connection between the slider and the roller maintaining plate, the two respective mediate portions of the top and bottom maintaining plates are fixed to the slider. Nevertheless, due to the narrow space, the mediate maintaining plate can only be fixed to the slider from ends thereof. U.S. Pat. No. 7,341,378 and U.S. Publication No. 20050018933 disclose a long and high rigid plate such as a steel plate to be used to support the roller maintaining plate. This increases the cost required.

The present invention intends to provide a circulation maintaining device for a linear slide assembly to allow the mediate roller maintaining plate to have higher strength while no extra part is needed. Besides, the present invention reduces the number of molds for injection molding the circulation maintaining device.

SUMMARY OF THE INVENTION

The present invention relates to a linear slide assembly and comprises a slider movably mounted to a rail. The slider has a top hole and a bottom hole defined in each of two sides thereof.

A circulation maintaining device is connected to the slider and comprises two top boards, and each top board has a top maintaining plate formed integrally on each of two sides thereof. A first half separation plate is connected to each top maintaining plate. One end of each first half separation plate is smoothly connected to the top maintaining plate, and a first half tube extends from the other end of each first half separation plate. The two top boards are respectively connected to the slider from the two ends of the slider, and the two top boards are connected to each other by the engagement between the end face holes and end face pins of the top connection boards. The first half tube is inserted into a top half circle of the top hole corresponding thereto. The top connection boards contact to the underside of the slider.

Four half mediate plates each have two second half separation plates located on top and bottom thereof. A second half tube and a half maintaining plate extend from each of two sides of the second half separation plate on the top. The half maintaining plate is shorter than the second half tube. The half maintaining plate has at least one stop and at least one recessed area defined in outside thereof. The second half separation plate on the bottom has maintaining portion which is connected to said half maintaining plate. The four half mediate plates are connected to the slider in pairs by engagement between the stops and the recessed areas. The two second half tubes of the two of the half mediate plates are inserted into a bottom half circle of the top hole and a top half circle of the bottom hole corresponding thereto. One end of half maintaining plate of one of the two half mediate plates is connected to one end of the maintaining portion of the other half mediate plate so as to cooperate with the slider and the rail to form a loaded path.

Two of the third half tubes each are inserted into a bottom half circle of the bottom hole corresponding thereto.

Two bottom boards each have a bottom maintaining plate and two of the third half separation plates on two ends of the bottom maintaining plate. The two bottom boards are connected to bottom of the two sides of the slider.

Two end caps are connected to two ends of the slider and each end cap has two of the fourth half separation plates on two sides thereof.

The second half tubes and the first half tubes form unloaded paths in the top holes of the slider, and the second half tubes and the third half tubes form unloaded paths in the bottom holes of the slider. The fourth half separation plates, the first half separation plates, the second half separation plates and the third half separation plates form turning paths which are located corresponding to the unloaded paths. Loaded paths are defined among the slider, the top maintaining plates, the half maintaining plates, the bottom maintaining plates and the rail, wherein the loaded paths are located corresponding to the unloaded paths. The unloaded paths, the turning paths and the loaded paths together form an enclosed circulation path.

Preferably, two grooves are respectively defined in two insides of the slider. The half maintaining plates each have a rib which is guided in the groove corresponding thereto to connect the half mediate plates to the slider. Preferably, each half maintaining plate has two ribs respectively located close to an open front end of the half maintaining plate and close to a rear end of the second half separation plates so as to position the half maintaining plates precisely.

Preferably, at least one dust-free plate is located at the underside of each top board, the underside of the bottom maintaining plate of each bottom board and the underside of each end cap.

Preferably, the second half separation plates each have a fixing hole and the third half separation plates each have a fixing rod which is engaged with the fixing hole to fix the bottom boards to the half mediate plates.

Preferably, the top boards, the half mediate plates, the third half tubes and the bottom boards each are integrally formed.

Preferably, the top maintaining plates of the top boards, the first half separation plates, the first half tubes, the second half separation plates of the half mediate plates, the second half tubes, the half maintaining plates, the third half tubes, the bottom maintaining plates of the bottom boards and the third half separation plates each have a guide recess. When the circulation path is assembled, each guide recess is smoothly connected to other adjacent guide recesses so as to guide the roller maintaining chain.

Preferably, the half maintaining plates of the half mediate plates each have a block and each end cap has a slot. The blocks are engaged with the slots when the end caps are connected to the two ends of the slider.

Preferably, each of the half maintaining plates of the half mediate plates extends in a longitudinal direction. The length of each of the recessed areas is longer than that of the stops in the longitudinal direction. The stops each have a thickness in the direction perpendicular to the longitudinal direction. Each recessed area has a depth in the direction that is perpendicular to the longitudinal direction. The thickness is equal to the depth.

The present invention has the following advantages:

The half mediate plates each have an integral half maintaining plate Which has stops and recessed areas along the longitudinal direction thereof so as to provide positioning effect in the transverse direction. The connection is reinforced and can bear larger forces coming from the rolling members.

The grooves and the ribs located between the slider and the half mediate plates allow the assembling processes to be easy. The ribs are guided in the grooves to provide positioning effect from top and bottom so as to ensure the half maintaining plates and each of the separation plates to be precisely positioned relative to the loaded path. The rolling members can smoothly enter the loaded path from the turning path to prevent impact between the slider and the end of the loaded path.

The half mediate plates each have a half maintaining plate, a maintaining portion and a second half separation plate, and the half maintaining plate, the maintaining portion and the second half separation plate are integrally formed so as to have better and secure connection. The maintaining portion of one of the half mediate plates and the half maintaining plate of the other half mediate plate are connected to each other at a remote position from the turning path to prevent the rolling members unsmooth movement due to the assembling error When the rolling members enter the loaded path from the turning path.

The top boards, the half mediate plates, the third half tubes and the bottom boards on the two ends of the slider are located symmetrically to each other, so that each part requires only one set of mold and this saves the manufacturing cost.

The top boards, the half mediate plates, the third half tubes and the bottom boards can be manufactured between top and bottom molds which are easily separated from each other obtain the products.

The dust-free plates are integrally and longitudinally formed on the top boards, the bottom maintaining plates of the bottom boards and the end caps concurrently by injection molding, so that no extra or secondary machining and assembling is required. The dust-free plates prevent dust from entering the circulation path.

The turning path is composed by the fourth half separation plates, the first half separation plates, the second half separation plates and the third half separation plates. When assembling, the top boards, the half mediate plates, the third half tubes and the bottom boards are first installed to the slider, the rolling members are then inserted into the unloaded path from the notch between the first half separation plates, the second half separation plates and the third half separation plates. The fourth half separation plates are then installed, so that the assembly of the present invention is easy.

The present invention will become more obvious from the following description when taken in connection with the accompanying drawings Which show, for purposes of illustration only, a preferred embodiment in accordance with the present invention.

DETAILED DESCRIPTION OF THE PREFERRED EMBODIMENT

Figure 1:
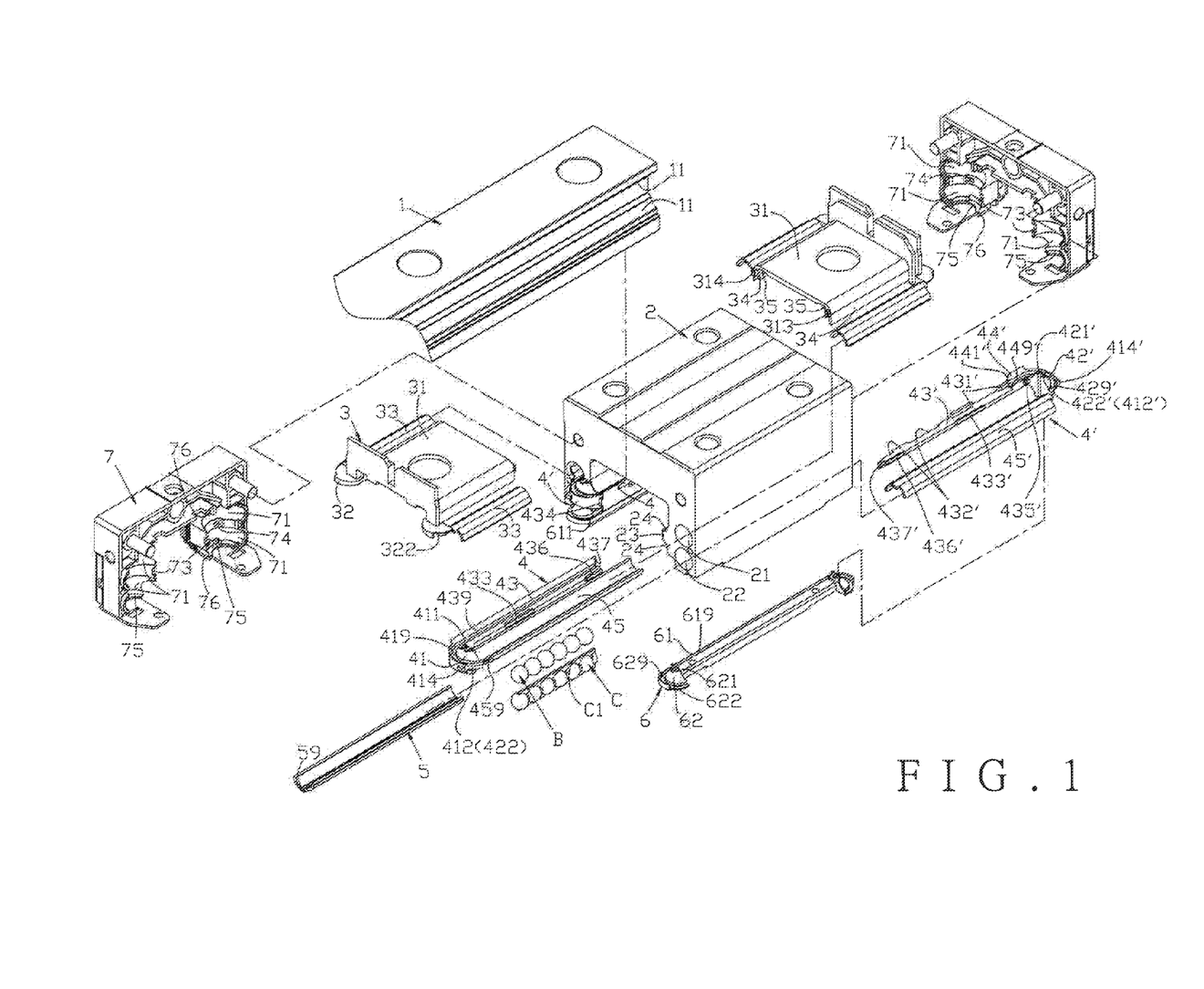
FIG. 1 is an exploded view to show the circulation maintaining device for a linear slide assembly of the present invention.
Figure 2:
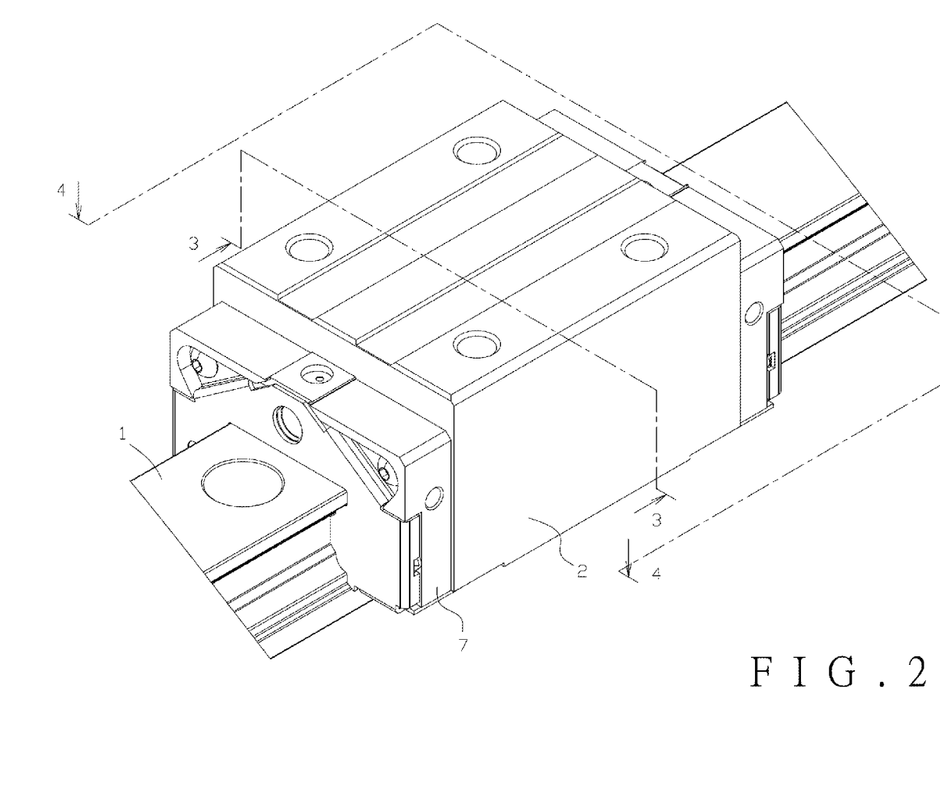
FIG. 2 is a perspective view to show the circulation maintaining device for a linear slide assembly of the present invention.
Figure 3:
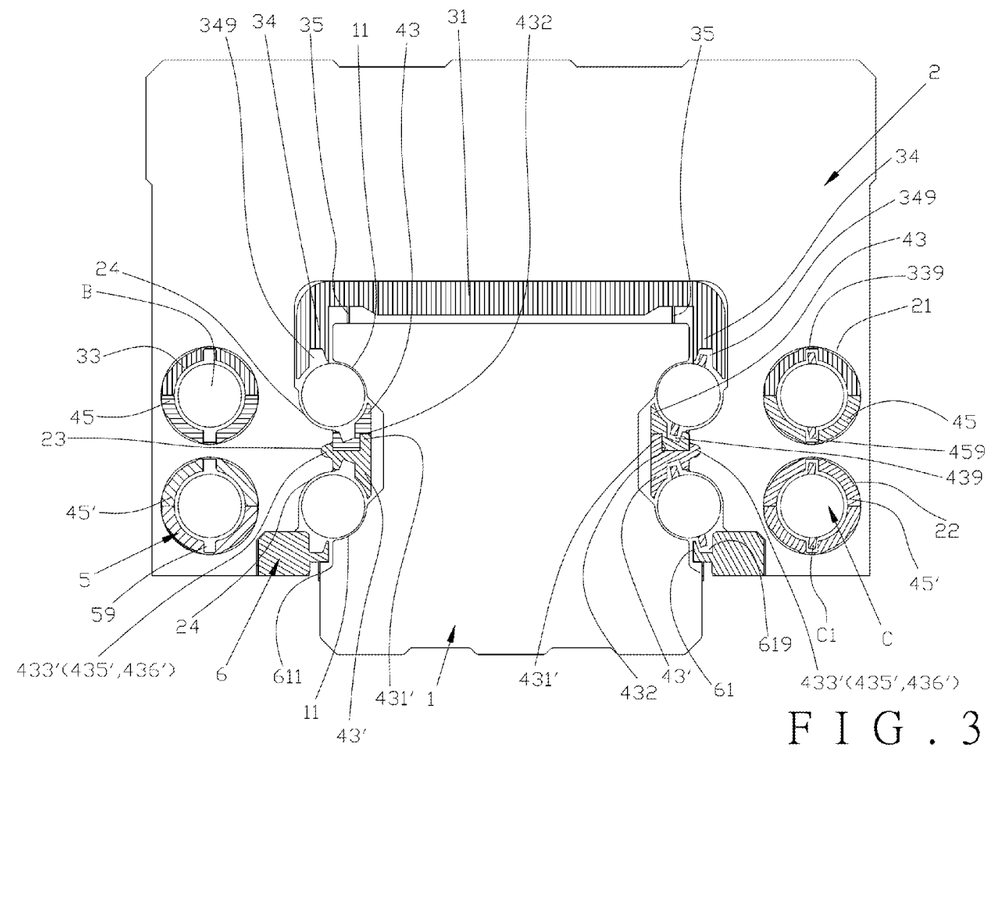
FIG. 3 is a cross sectional view, taken along line 3-3 in FIG. 2.
Figure 4:
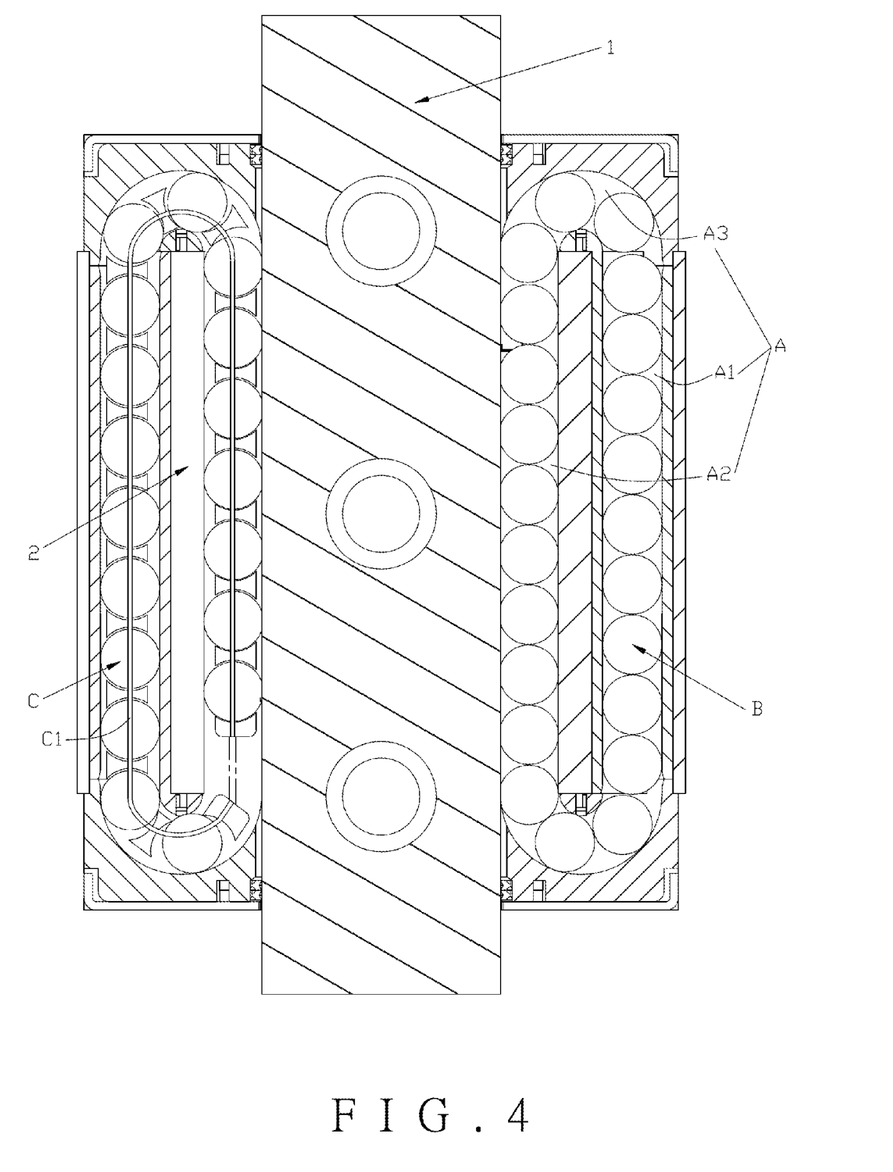
FIG. 4 is a cross sectional view, taken along line 4-4 in FIG. 2.

Referring to FIGS. 1, 3 and 4, the circulation maintaining device for a slide assembly of the present invention comprises a slider 2 which is movably mounted to a rail 1. An upper hole 21 and a bottom hole 22 are defined in each of two sides of the slider 2. Two grooves 23 are respectively defined in two insides of the slider 2. A circulation maintaining device is connected to the slider 2 to form a slider assembly so as to form an enclosed circulation path "A" by the circulation maintaining device, the slider 2 and the rail 1. The circulation path "A" comprises a loaded path "A2" between the slider 2 and the rail 1, an unloaded path "A1" in the slider 2, and two turning paths "A3" connected between two ends of the loaded path "A2" and the unloaded path "A1". Rolling members "B" or a maintaining chain "C" equipped with the rolling members "B" is movably located in the circulation path "A". In this embodiment, the rolling members "B" are rolling balls, so that the slider assembly is movable relative to the rail 1 by the rolling of the rolling members "B".

As shown in FIG. 1, the circulation maintaining device comprises two top boards 3 each having a first half tube 33, four half mediate plates 4, 4' each having a second half tube 45, 45', two of the third half tubes 5, two bottom boards 6 and two end caps 7. Each of the two top boards 3, the four half mediate plates 4, 4', the two of the third half tubes 5, the two bottom boards 6 and the two end caps 7 can be manufactured by way of injection molding in one set of molds each comprising an upper mold and a lower mold, and are located symmetrically on two sides of the slider 2 so as to save the expense of molds.

Figure 5:
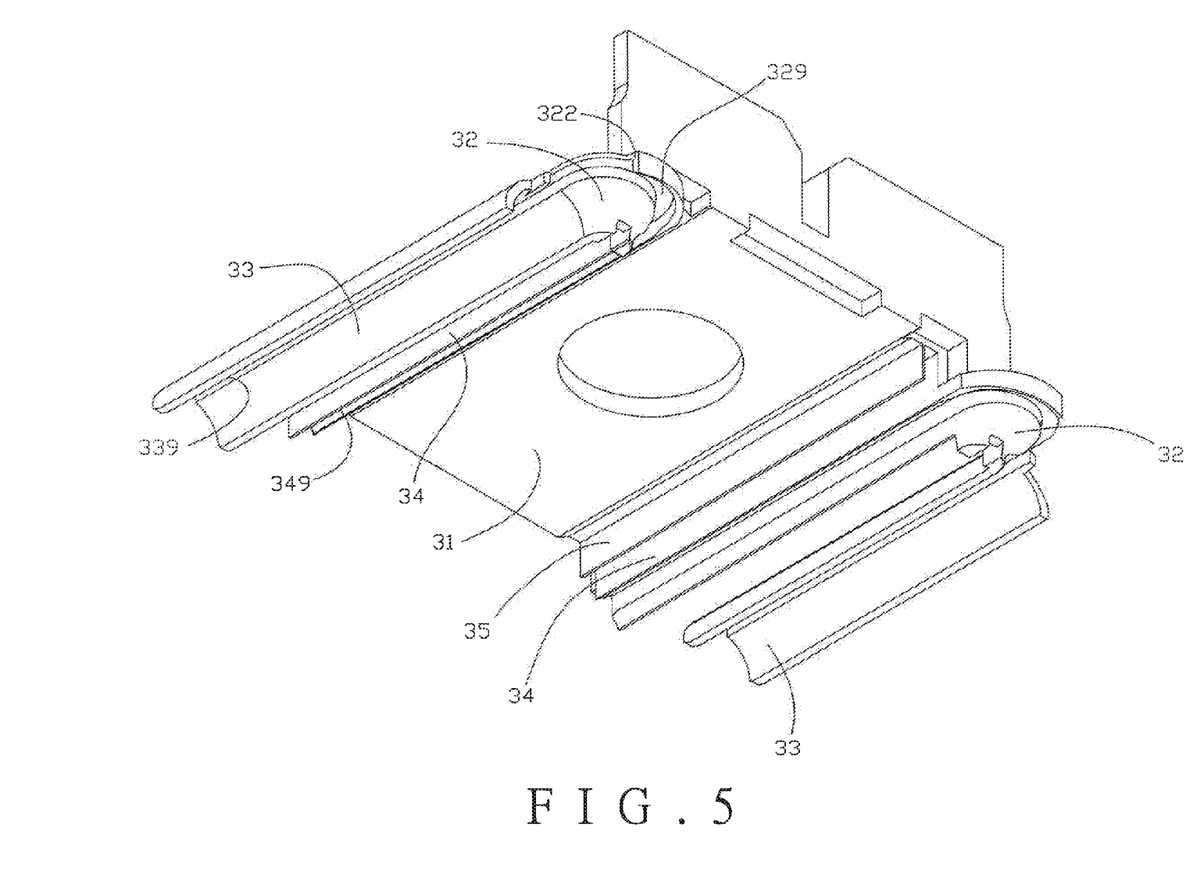
FIG. 5 is a right-bottom view of the top board of the present invention.

As shown in FIGS. 1, 3 and 5, each of the top boards 3 of the circulation maintaining device comprises a top connection board 31 which is connected to top maintaining plates 34 on the two sides of the slider 2 to increase the rigidity. Each side of the top board 3 has a first half separation plate 32 which has one end connected to one end of the top maintaining plate 34, the first half tube 33 extends from the other end of each first half separation plate 32. Two dust-free plates 35 are respectively connected to the bottom side of the top connection board 31 and located near two sides of the top connection board 31. The two top connection boards 31 are respectively connected to two ends of the slider 2. More specifically, when assembling, the two top boards 3 are connected to each other by respectively connecting one end face hole 313 and one end face pin 314 of the connection board 31 of one top board 3 to the other end face pin 314 and the other end face hole 313 of the connection board 31 of the other top board 3. The top connection boards 31 are matched and securely connected to the underside of the slider 2 so as to enhance the structural stiffness between the slider 2 and the two top boards 3. The first half tubes 33 are inserted into the top half circle of the top holes 21 on the two sides of the slider 2.

Figures 6A, 6B:
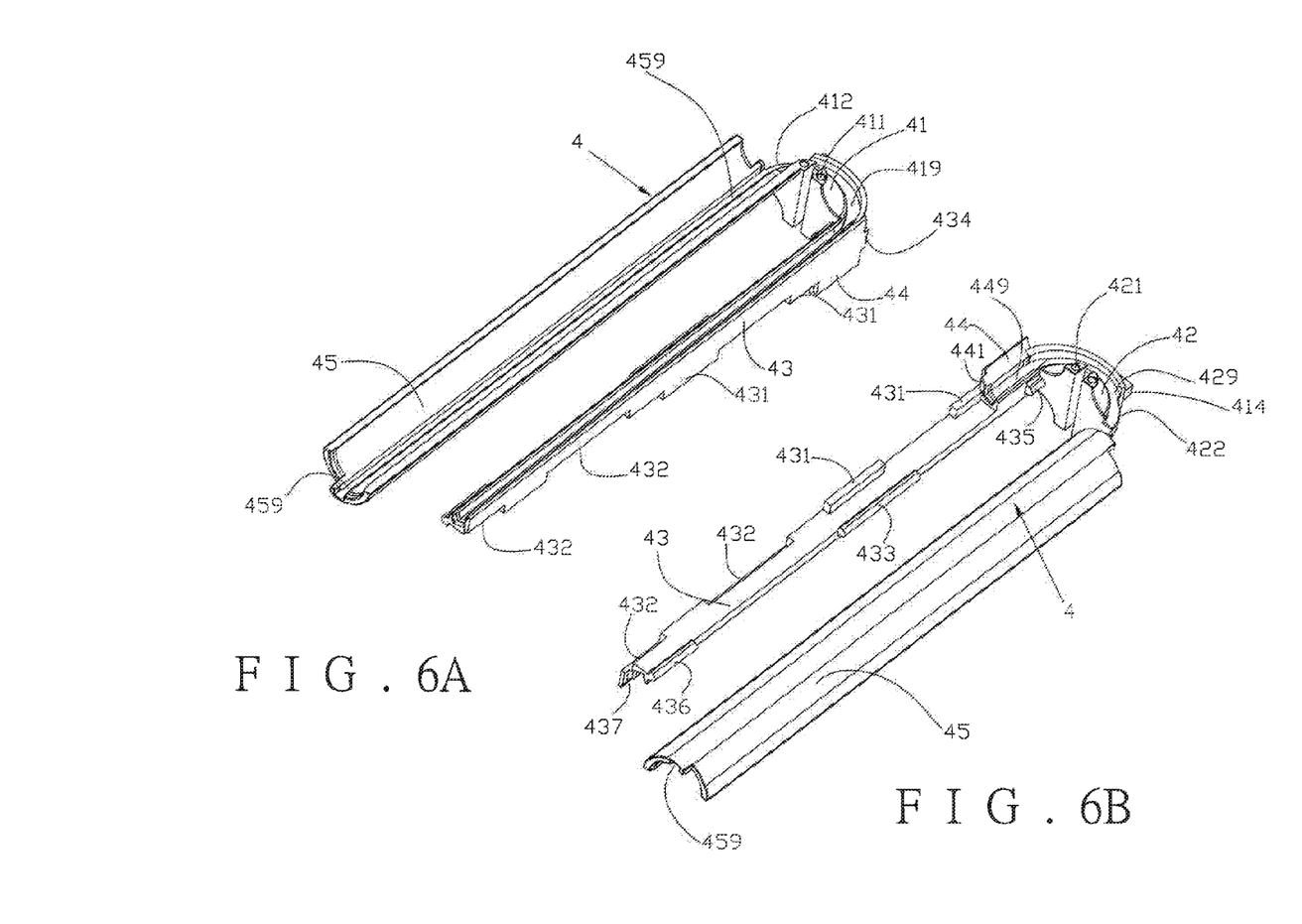
FIG. 6A is top-left view of the half mediate plate of the present invention.
FIG. 6B is bottom-left view of the half mediate plate of the present invention.

As shown in FIGS. 6A and 6B, the half mediate plates 4, 4' have the identical structure, and the half mediate plate 4 is taken as the example. The half mediate plate 4 has a top second half separation plate 41 and a bottom second half separation plate 42, the top second half separation plate 41 and the bottom second half separation plate 42 are mirror image to each other. The top second half separation plate 41 and the bottom second half separation plate 42 respectively have fixing holes 411, 421 defined therein. A second half tube 45 and a half maintaining plate 43 extend from each of two sides of the top second half separation plate 41. The half maintaining plate 43 has a stop 431 and a recessed area 432 defined in outside thereof which faces the second half tube 45. The longitudinal length of the recessed area 432 is longer than that of the stop 431. The depth of the recessed area 432 is the same as that of the stop 431. The half maintaining plate 43 has ribs 433, 435, 436 located corresponding to the groove 23 of the slider 2. Preferably, the ribs 433, 435, 436 are respectively located the middle section, the front end and the rear end of the half maintaining plate 43. In this embodiment, the half maintaining plate 43 is shorter than the second half tube 45. The bottom second half separation plate 42 has a maintaining portion 44 extending from the side that the half maintaining plate 43 is connected, the maintaining portion 44 is connected to the half maintaining plate 43. A recess 441 is defined in the end of the maintaining portion 44. The half maintaining plate 43 has a block 437 on one end thereof which has the thickness the same as the depth of the recess 441. The half maintaining plate 43 has a block 434, and the top second half separation plate 41 and the end of the bottom second half separation plate 42 has a block 414.

As shown in FIG. 1, the four half mediate plates 4, 4' are connected to the two opposite ends of the slider 2 in pairs, and the two second half tubes 45, 45' of the two half mediate plates 4, 4' on the same side of the slider are inserted into the bottom half circle of the top hole 21 and the top half circle of the bottom hole 22 respectively. This means that the second half tube 45 of the half mediate plates 4 is inserted into the top hole 21, and the second half tube 45' of the other mediate plates 4' is inserted into the bottom hole 22 on the same side of the top hole 21.

As shown in FIGS. 1, 3, 8A and 8B, the ribs 433, 435, 436, 433', 435', 436' of the two half maintaining plates 43, 43', on the same side and at opposite ends, are inserted into the grooves 23, wherein the ribs 433, 435, 436 and the ribs 433', 435', 436' are located alternatively to each other so as to have good positioning effect in the vertical direction. The ribs 435, 436, 435', 436' of the front and rear ends of the half maintaining plates 43, 43' ensure the front and rear ends of the half maintaining plates 43, 43' to be positioned precisely. The stops 431, 431' and the recessed areas 432, 432' are engaged with each other to have good positioning effect in the transverse direction so that the half mediate plates 4, 4' do not flip or curved and hence can bear higher impact from the rolling members "B". The depth of the recessed areas 432, 432' is the same as the thickness of the stops 431, 431' so that the rolling members "B" can move smoothly.

As shown in FIGS. 1 and 3, the third half tubes 5 are inserted into the bottom half circle of the bottom holes 22 in two sides of the slider 2.

Figure 7:
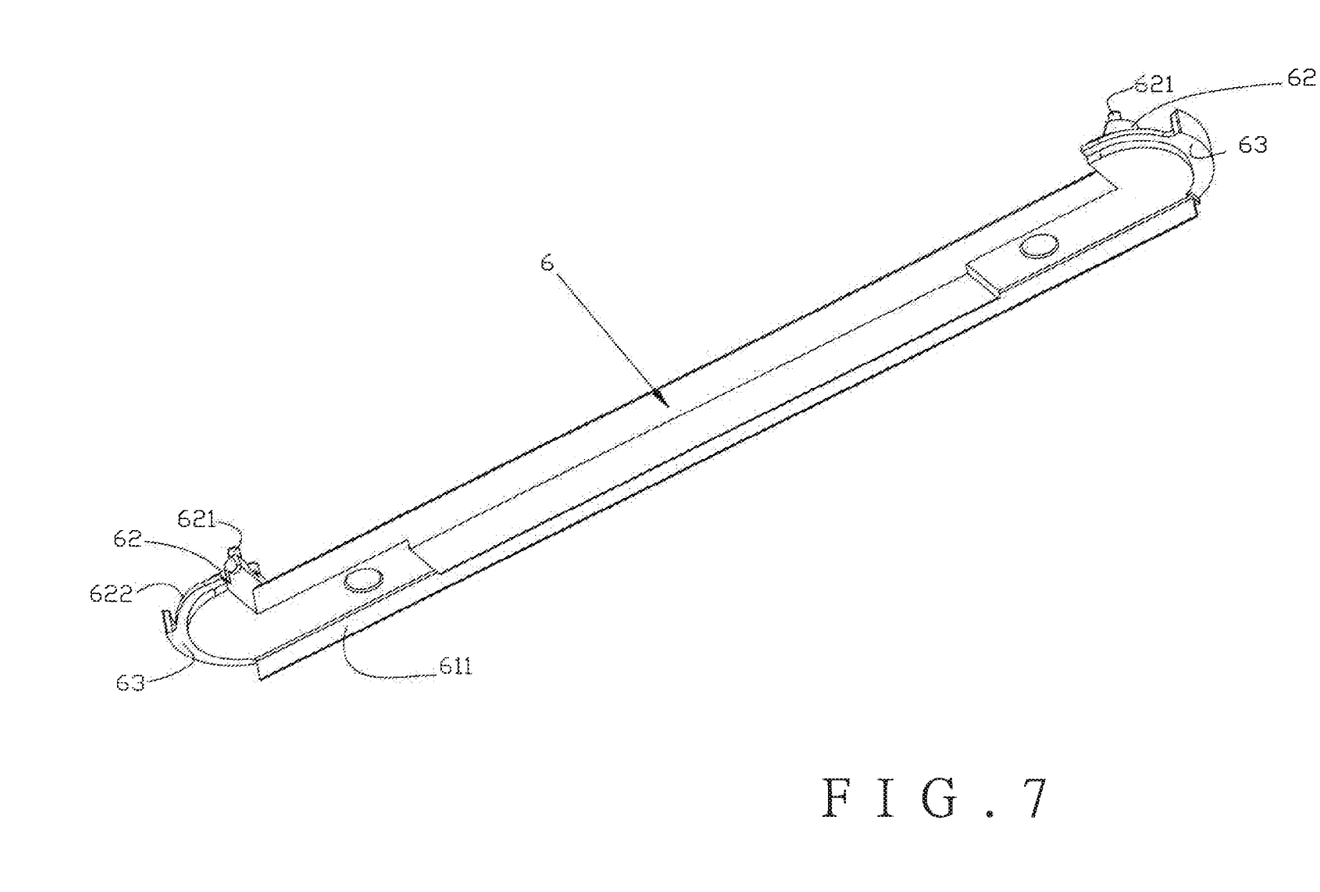
FIG. 7 is a right-bottom view of the bottom board of the present invention.

As shown in FIGS. 1 and 7, each of the two bottom boards 6 has a bottom maintaining plate 61 which has a dust-free plate 611 connected to the underside thereof. Two of the third half separation plates 62 are connected to two ends of the bottom maintaining plate 61. The third half separation plates 62 each have a fixing rod 621. The two bottom boards 6 are connected to bottom of the two sides of the slider 2 by engagement of the fixing rods 621 and the fixing holes 411', 421' of the top and bottom second half separation plate 41', 42'. The fixing hole 411' is the same as the fixing hole 411 and hence is not shown in the drawings. The bottom boards 6 are fixed to the half mediate plates 4'. A recess 63 is defined in the third half separation plate 62.

As shown in FIGS. 1, 4 and 5, the top maintaining plates 34, the first half tubes 33 and the first half separation plates 32 provided by the top boards 3, the half maintaining plates 43, 43', the maintaining portions 44, 44', the top second half separation plates 41, 41', the bottom second half separation plates 42, 42', and the second half tubes 45, 45' provided by the half mediate plates 4, 4', the third half tubes 5, and the bottom maintaining plates 61 and the third half separation plates 62 provided by the bottom boards 61 each have a guide recess 349, 339, 329, 439, 449, 419, 429, 459, 59, 619, 629 for the roller maintaining chain "C" and are smoothly connected. The first half separation plates 32, the top second half separation plates 41, 41', the bottom second half separation plates 42, 42' and the third half separation plates 62 each have a notch 322, 412, 412', 422, 422', 622. After the top boards 3, the half mediate plates 4, 4', the third half tubes 5 and the bottom boards 6 are assembled, the rolling members "B" or the roller maintaining chain "C" is installed in the circulation path "A" via, the notches 322, 412, 412', 422, 422', 622. The connection member "C1" of the roller maintaining chain "C" (shown in FIGS. 3 and 4) is introduced into the guide recesses 349, 339, 329, 439, 449, 419, 429, 459, 59, 619, 629.

As shown in FIGS. 1, 3 and 4, in the top holes 21 and the bottom holes 22 of the slider 2, the second half tubes 45, 45' are respectively cooperated with the first half tube 33 and the third half tube 5 to form the unloaded paths "A1". The loaded paths "A2" are formed by the cooperation among first rails 11 located on the rail 1, second rails 24 located on the inside of the slider 2, the top maintaining plates 34, the half maintaining plates 43 and the maintaining portions 44', or formed by the cooperation among the first and second rails 11, 24, the bottom maintaining plates 61, the half maintaining plates 43', and the maintaining portions 44. When the rolling members "B" or the roller maintaining chain "C" is installed, the two end caps 7 are connected to the two ends of the slider 2. Each side of each end cap 7 has two of the fourth half separation plates 71 located corresponding to the first half separation plate 32, the top second half separation plates 41, 41', the bottom second half separation plates 42, 42' and the third half separation plates 62. On the two ends of the slider 2, the turning paths "A3" are formed by the cooperation among the fourth half separation plates 71, the first half separation plate 32, the top second half separation plates 41 and the bottom second half separation plates 42', or are formed by the cooperation among the fourth half separation plates 71, the third half separation plates 62 and the top second half separation plates 41' and the bottom second half separation plates 42. The turning paths "A3" are located corresponding to the unloaded paths "A1" and the loaded path "A2".

The circulation path "A" is composed of the unloaded paths "A1", the loaded path "A2" and the turning paths "A3". The rolling members "B" or the roller maintaining chain "C" moves along the circulation path "A" and drives the slider 2 along the rail 1. As shown in FIG. 1, there are two dust-free plates 76 respectively connected to the two sides of the underside of the slider 2. The dust-free plates 76, 35, 611 contact the rail 1 when the slider 2 moves along the rail 1 to prevent dust from entering the circulation path "A" to contaminate the rolling members "B" or the roller maintaining chain "C", and hence to keep the rolling members "B" or the maintaining chain "C" moves smoothly.

As shown in FIGS. 3, 4, 6, 8A and 8B, because the half maintaining plates 43, 43' are shorter than the second half tubes 45, 45' so that when assembling, the loaded paths "A2" are formed among the slider 2, the half maintaining plates 43, 43', the maintaining portions 44, 44' and the rail 1. The half maintaining plates 43, 43' are connected with the maintaining portions 44, 44' at the linear loaded paths "A2". Therefore, when the rolling members "B" enter the loaded path "A2" from the turning path "A3", the rolling members are smoothly guided by the integral half mediate plates 4, 4', and the ribs 433, 435, 436, 433', 435', 436' are precisely engaged with the grooves 23 so that no surplus material/burr or defects or mis-alignment to affect the rolling members "B" to move into or leave from the loaded paths "A2". The rolling members "B" in the loaded paths "A2" are guided by the second rails 24 and the first rails 11 so that they are not affected by the connection portion between the half maintaining plates 43, 43' and the maintaining portions 44, 44'.

The end caps 7 each have slots 73, 74 and flanges 75. The slots 73 are located corresponding to the blocks 434, 434' of the half maintaining plates 43, 43'. The slots 74 are located corresponding to the blocks 414, 414' of the half maintaining plates 41, 41'. The flanges 75 are located corresponding to the recess 63 of the bottom board 6. After the end caps 7 are connected to the two ends of the slider 2, the blocks 434/434' and 414/414' and the flanges 75 are respectively engaged with the slots 73 and 74 and the recess 63 to precisely position the end caps 7, the half mediate plates 4, 4' and the bottom boards 6.

Figure 8A:
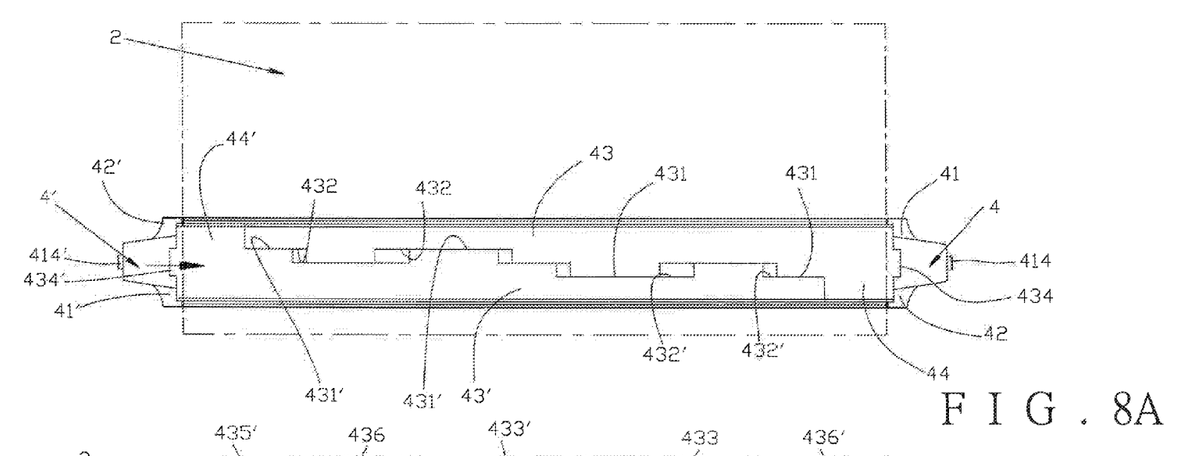
FIG. 8A shows the top view of the connection of the two half mediate plates.
Figure 8B:
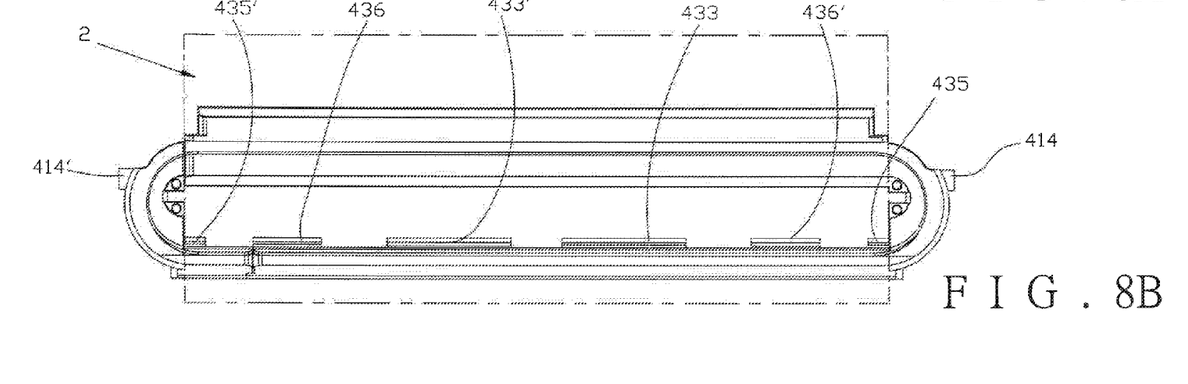
FIG. 8B shows the side view of the connection of the two half mediate plates.
Figures 9A, 9B:
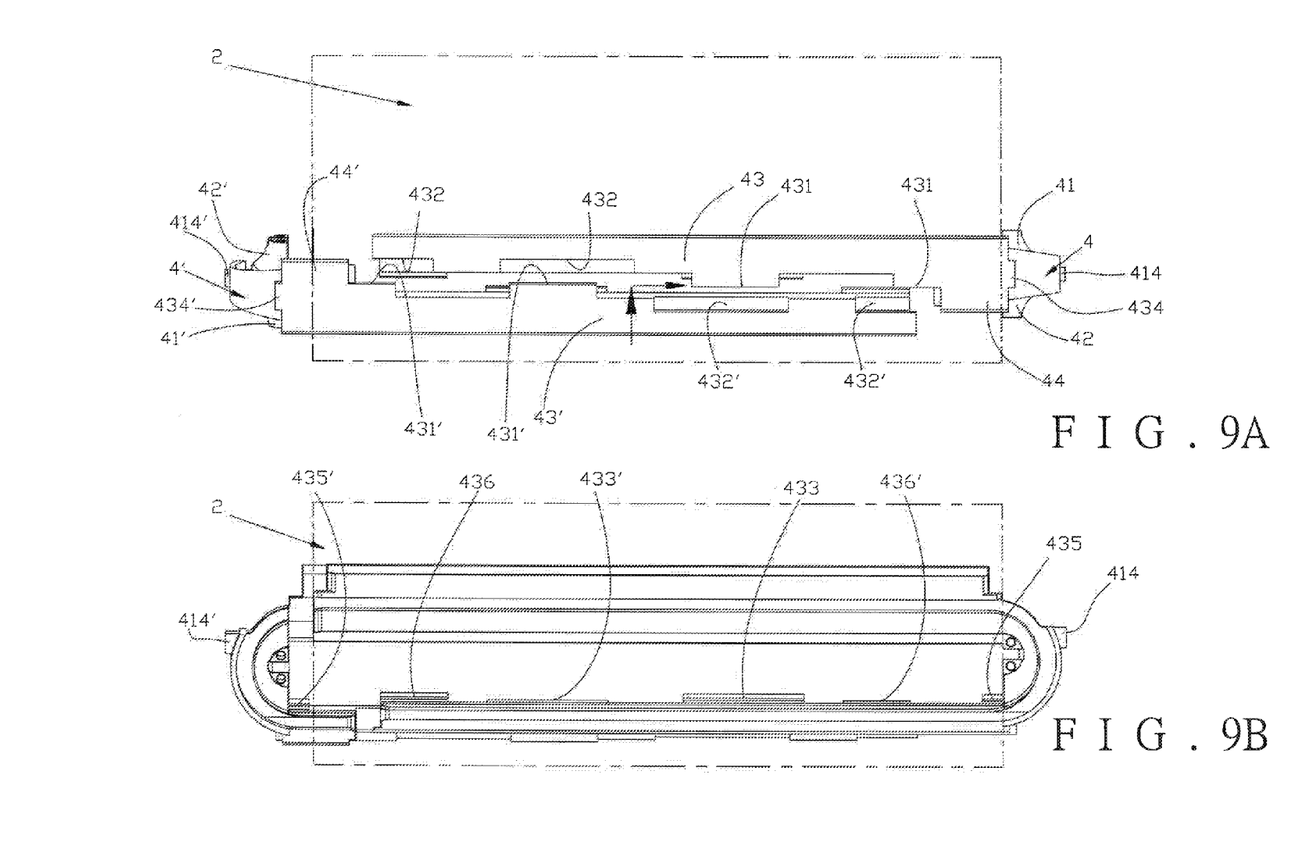
FIG. 9A shows the top view of the connection of the half mediate plates.
FIG. 9B shows the side view of the connection of the half mediate plates.

FIGS. 9A and 9B disclose the installation of the two half mediate plates 4, 4'. The length of the recessed areas 432 in the half maintaining plate 43 is longer than the stops 431 in the axial direction. When assembly, the half mediate plate 4 is firstly installed to the slider 2, the second half tube 45 is inserted into the top hole 21, and the ribs 433, 435, 436 are inserted into the grooves 23. The other half mediate plate 4' is then installed to the slider 2 by inserting the second half tube 45' to the bottom hole 22 from the other end of the slider 2 till the rib 435' is located on outside of the slider 2. Under this arrangement, the ribs 433', 436' and the ribs 433, 435, 436 are alternatively engaged with the grooves 23 and the stops 431, 431' of the half mediate plates 4, 4' are engaged with the recessed areas 432, 432' so as to position the mediate plate 4' in the transverse direction. The half mediate plate 4' is then pushed axially, as shown by the arrowhead, to be positioned. Consequently, the rib 435 is inserted into the groove 23, and the blocks 437, 437' on the half maintaining plates 43, 43' are engaged with the recesses 441, 441' of the maintaining portions 44, 44', as shown in FIGS. 1, 8A and 8B.

While we have shown and described the embodiment in accordance with the present invention, it should be clear to those skilled in the art that further embodiments may be made without departing from the scope of the present invention.

What is claimed is:

1. A circulation maintaining device for a linear slide assembly, wherein the circulation maintaining device is adapted to be connected to a slider to form a slider assembly, the slider assembly is movably mounted to a rail, a top hole and a bottom hole are defined on each of two sides of the slider, and two grooves are respectively defined on two insides of the slider, the circulation maintaining device comprising:

two top boards, each top board having a top maintaining plate on each of two sides thereof, a first half separation plate connected to each top maintaining plate, a first half tube extending from each first half separation plate, the first half tube inserted into a top half circle of the top hole corresponding thereto;

four half mediate plates each having a second half separation plate, a second half tube and a half maintaining plate respectively extending from each of two sides of each of the second half separation plates, the half maintaining plate having a stop and a recessed area defined in outside thereof which faces the second half tube, the half maintaining plate having a rib located corresponding to the groove of the slider, wherein two of the second half tubes of the half mediate plates located at the same side of the slider respectively inserted into a bottom half circle of the top hole and a top half circle of the bottom hole from opposite ends of the slider, and two half maintaining plates corresponding to the two second half tubes engaged with each other by the stops and recessed areas, so that the four half mediate plates are connected in pairs;

two of the third half tubes each being inserted into a bottom half circle of the bottom hole corresponding thereto;

two bottom boards each having a bottom maintaining plate and two of the third half separation plates on two ends of the bottom maintaining plate, the two bottom boards connected to bottom of the two sides of the slider;

two end caps connected to two ends of the slider and each end cap having two of the fourth half separation plates on two sides thereof; and the second half tubes and the first half tubes forming unloaded paths in the top holes of the slider, the second half tubes and the third half tubes forming unloaded paths in the bottom holes of the slider, the fourth half separation plates, the first half separation plates, the second half separation plates and the third half separation plates forming turning paths which are located corresponding to the unloaded paths, loaded paths being defined among the slider, the top maintaining plates, the half maintaining plates, the bottom maintaining plates and the rail, the loaded paths located corresponding to the unloaded paths, the unloaded paths, the turning paths and the loaded paths forming an enclosed circulation path.

2. The circulation maintaining device 1 as claimed in claim 1, wherein each half maintaining plate has two ribs respectively located close to an open front end and a rear end of the half maintaining plate, the rear end connected to the second half separation plates.

3. The circulation maintaining device as claimed in claim 1, wherein at least one dust-free plate is located at an underside of each top board, an underside of the bottom maintaining plate of each bottom board and an underside of each end cap.

4. The circulation maintaining device as claimed in claim 1, wherein the second half separation plates each have a fixing hole, and the third half separation plates each have a fixing rod which is engaged with the fixing hole to fix the bottom boards to the half mediate plates.

5. The circulation maintaining device as claimed in claim 1, wherein the top boards, the half mediate plates, the third half tubes and the bottom boards each are integrally formed.

6. The circulation maintaining device as claimed in claim 1, wherein the top maintaining plates of the top boards, the first half separation plates, the first half tubes, the second half separation plates of the half mediate plates, the second half tubes, the half maintaining plates, the third half tubes, the bottom maintaining plates of the bottom boards and the third half separation plates each have a guide recess, when the circulation path is assembled, each guide recess is smoothly connected to other adjacent guide recesses.

7. The circulation maintaining device as claimed in claim 1, wherein a length of the half maintaining plates is shorter than that of the second half tubes, each of the half mediate plates has a maintaining portion which starts from the second half separation plates toward positions where the half maintaining plates extend, so that the maintaining portions of the half mediate plates which are inserted from one end of the slider are smoothly connected the half maintaining plates of the other half mediate plates inserted from the other end of the slider, the half maintaining plates of the half mediate plates, the slider and the rail form the loaded paths.

8. The circulation maintaining device as claimed in claim 1, wherein the half maintaining plates of the half mediate plates each have a block, each end cap has a slot, the blocks are engaged with the slots when the end caps are connected to the two ends of the slider.

9. The circulation maintaining device as claimed in claim 1, wherein each of the half maintaining plates of the half mediate plates extends in a longitudinal direction, a length of each of the recessed areas is longer than that of the stops in the longitudinal direction.

10. The circulation maintaining device as claimed in claim 1, wherein each of the half maintaining plates of the half mediate plates extends in a longitudinal direction, the stops each have a thickness in a direction perpendicular to the longitudinal direction, each recessed area has a depth in a direction that is perpendicular to the longitudinal direction, and the thickness is equal to the depth.

11. The circulation maintaining device as claimed in claim 1, wherein each of the second half separation plates of the half mediate plates has a top second half separation plate and a bottom second half separation plate, the top second half separation plate and the bottom second half separation plate are mirror image to each other.

12. A half mediate plate of a circulation maintaining device for a linear slide assembly, which comprises a half separation plate, a half tube and a half maintaining plate respectively extending from each of two sides of the half separation plate, the half maintaining plate having a stop and a recessed area defined in outside thereof which faces the half tube, wherein a length of the half maintaining plate is shorter than that of the half tube, and the half mediate plate has a maintaining portion which starts from the half separation plate toward position where the half maintaining plate extend from.

13. The half mediate plate as claimed in claim 12, wherein the half mediate plate is integrally formed.

14. The half mediate plate as claimed in claim 12, wherein the half separation plate, the half tube, and the half maintaining plate each have a guide recess.

15. The half mediate plate as claimed in claim 12, wherein the half maintaining plate has a block.

16. The half mediate plate as claimed in claim 12, wherein the half maintaining plate of the half mediate plate extends in a longitudinal direction, and a length of the recessed area is longer than that of the stop in the longitudinal direction.

17. The half mediate plate as claimed in claim 12, wherein the half maintaining plate of the half mediate plate extends in a longitudinal direction, the stop has a thickness in a direction perpendicular to the longitudinal direction, the recessed area has a depth in the direction perpendicular to the longitudinal direction, and the thickness is equal to the depth.

18. A half mediate plate of a circulation maintaining device for a linear slide assembly, which comprises a half separation plate, a half tube and a half maintaining plate respectively extending from each of two sides of the half separation plate, the half maintaining plate having a stop and a recessed area defined in outside thereof which faces the half tube and the half maintaining plate having a rib defined in inside thereof which faces the half tube.

19. The half mediate plate as claimed in claim 18, wherein the half maintaining plate has two ribs respectively located close to an open front end and a rear end of the half maintaining plate, the rear end connected to the half separation plate.

* * * * *